United States Patent
Gadde et al.

(10) Patent No.: US 9,412,029 B2
(45) Date of Patent: Aug. 9, 2016

(54) APPARATUS FOR RECOGNIZING IRIS AND OPERATING METHOD THEREOF

(71) Applicant: IRIS ID, INC., Seoul (KR)

(72) Inventors: Ravindra Gadde, East Windsor, NJ (US); Monalisa Mazumdar, Plainsboro, NJ (US); Sehhwan Jung, Plainsboro, NJ (US)

(73) Assignee: IRIS ID, INC., Seoul (KR)

( * ) Notice: Subject to any disclaimer, the term of this patent is extended or adjusted under 35 U.S.C. 154(b) by 0 days.

(21) Appl. No.: 14/569,092

(22) Filed: Dec. 12, 2014

(65) Prior Publication Data

US 2016/0171323 A1    Jun. 16, 2016

(51) Int. Cl.
*G06K 9/00* (2006.01)

(52) U.S. Cl.
CPC ........ *G06K 9/00899* (2013.01); *G06K 9/00604* (2013.01)

(58) Field of Classification Search
None
See application file for complete search history.

(56) References Cited

U.S. PATENT DOCUMENTS

| | | | | |
|---|---|---|---|---|
| 2004/0061828 | A1* | 4/2004 | Newman | G02C 7/04 351/159.03 |
| 2008/0253622 | A1* | 10/2008 | Tosa | G06K 9/00604 382/117 |
| 2010/0284576 | A1* | 11/2010 | Tosa | G06K 9/00597 382/117 |

OTHER PUBLICATIONS

Contact Lens Detection Based on weighted LBP. Hui Zhang, Zhenan Sun, Tieniu Tan. 2010.*
Counterfeit Iris Detection Based on Texture Analysis. Zhuoshi Wei, Xianchao Qiu, Zhenan Sun and Tieniu Tan. 2008.*
Automated Classification of Contact Lens Type in Iris Images. James S. Doyle, Patrick J. Flynn, Kevin W. Bowyer. Mar. 2013.*
Degradation of Iris Recognition Performance Due to Non-Cosmetic Prescription Contact Lenses, Jun. 2010.*

* cited by examiner

*Primary Examiner* — Stephen R Koziol
*Assistant Examiner* — Delomia L Gilliard
(74) *Attorney, Agent, or Firm* — Loza & Loza, LLP; Heidi Eisenhut

(57) ABSTRACT

An apparatus for recognizing iris in an eye is provided. An image collecting unit collects an image of the eye. A control unit detects whether a user wears a contact lens, based on an edge component on the image of the eye.

5 Claims, 6 Drawing Sheets

APPARATUS FOR RECOGNIZING IRIS AND OPERATING METHOD THEREOF

BACKGROUND

The present disclosure relates to an apparatus for recognizing iris and its operating method. More particularly, to an apparatus for recognizing iris that effectively uses the information regarding the presence of contact lens and operating method of the apparatus.

Electronic devices such as computers and cellular phones include user's personal information in many cases. In some cases, the personal information is being used for electronic commerce too. In any case, these devices need to ensure the personal information can only be used (or) accessed by the original user. This sheds light on problem of accurately identifying a user. To this end, method of identifying a user by using a password and ID has been widely used. However, this method has limitations with respect to personal information protection and anti-hacking. Thus, many alternatives to replace it have been proposed.

Among them, a biometric system is being gradually commercialized. Traditionally, biometric systems use human being's physical characteristics to identify him. Fingerprint recognizing devices are one of the best-commercialized and widely used systems in electronic devices and especially in cellular phones. However, concerns regarding easy spoofing of fingerprints increased the speculations regarding system's security. Thus, an apparatus for recognizing iris has received attention as an alternative method for providing better security.

The apparatus for recognizing iris is an apparatus that makes use of pattern on the iris of a person's eye to check the identity of the person. Such an iris recognizing apparatus has an advantage over fingerprint, as it is hard to spoof iris.

However, people who wear contact lenses for beauty or for eyesight correction are recently increasing. Presence of contact lens has a limitation, as it sometimes may obstruct the original pattern present on the iris and hence affect the performance of iris recognition system. Based on the material, contact lenses can be broadly divided in to two different categories 1) Hard contact lens and 2) Soft contact lens. All other contact lens types can be considered as either derivatives or advancements of these two contact lenses.

The soft contact lens can be of two types. The contact lenses, which are used for beauty purposes, are known as cosmetic contact lens and the lens which are used only for vision and which are clear are called clear soft contact lens. Hard contact lenses are hard, small and used for vision correction. Each type of contact lens has its own effect on iris recognition. In particular, use of cosmetic contact lens that comes in various colors and appearances may cover about 10% to 80% of original iris pattern. There is a chance that someone using cosmetic contact lens can impersonate a person by copying and printing the iris pattern of the target person on to the contact lens. Thus, there is a need for iris recognition systems to detect the presence of contact lens along with determining the type of contact lens worn.

SUMMARY

Embodiments provide apparatus and operation method for recognizing iris that also effectively detects the presence of contact lens and hence determine the type of lens.

In one embodiment, an apparatus for recognizing iris in an eye includes an image capturing unit, which collects image of the eye; and a control unit that recognizes the person based on the pattern information present on the iris region of the eye image.

The impact of hard contact lens and cosmetic soft contact lens on iris recognition is more compared to that of clear soft contact lens. Soft contact lens needs to be distinguished from cosmetic soft contact lens, as it may have less or no impact on the iris recognition system when compared with cosmetic soft lens. Hence, for classification based on impact on iris recognition performance, contact lens can be divided in to 1) Hard contact lens 2) Cosmetic soft contact lens 3) Clear soft contact lens.

For detecting hard contact lens, the control unit examines curved features present in the iris region of the eye image. The control unit compensates for obstruction caused by edges of the hard contact lens, when user wears it.

The control unit determines the presence of cosmetic contact lens by examining:
1) Thickness of the boundary between the sclera region and iris region of the eye.
2) The pattern present on the iris region.

The control unit may not perform iris recognition if the artificial pattern introduced by cosmetic contact lens cover original pattern on iris region.

For detecting soft contact lens, the control unit examines curved features in the sclera region of the eye. As it is a believed that presence of soft contact lens has less (or) no impact on performance of iris recognition. The control unit may perform iris recognition, if it determines the lens worn are purely clear soft contact lens and not cosmetic soft contact lens.

In another embodiment, an operating method of an apparatus for recognizing iris in an eye includes capturing the image of the eye; and creating edge map, using which the presence of contact lens is determined.

The details of one or more embodiments are set forth in the accompanying drawings and the description below. Other features will be apparent from the description and drawings, and from the claims.

DETAILED DESCRIPTION OF THE EMBODIMENTS

Figure 1:
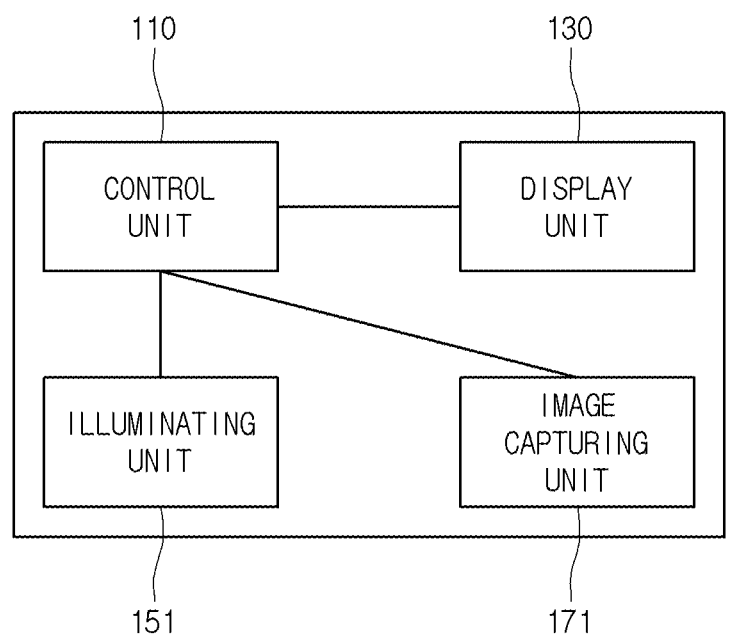
FIG. 1 shows a block diagram of apparatus for recognizing iris according to an embodiment.

Embodiments of the present invention are described below in detail with reference to the accompanying drawings so that a person skill in the art may easily practice the present invention. However, the present invention may be implemented in several different forms and is not limited to embodiments that are described herein. In addition, parts having no impact on descriptions are dropped in the drawings in order to make the present invention clear and similar parts throughout the disclosure have similar reference numerals.

In addition, when it is described that a part includes some elements, it should be understood that it might not exclude but further include other elements if there is no specific objection.

FIG. 1 shows a block diagram of apparatus for recognizing iris according to an embodiment (hereinafter, referred to as an "iris recognizing apparatus") according to an embodiment.

As shown in FIG. 1, an iris recognizing apparatus 100 includes an illuminating unit 151, an image capturing unit 171, a control unit 110, and a display unit 130.

The illuminating unit 151 radiates infrared rays to an eye including iris being the recognition target. In this case, the illuminator of the illuminating unit 300 may be near infrared (NIR) with wavelengths in the range of about 700 nm to 900 nm. In a particular embodiment, the iris recognizing apparatus 100 may include dual illuminating units.

The image capturing unit 171 acquires images of an eye, which are radiated by illuminating unit 151. Images thus captured are used for iris recognition. The image capturing unit 171 needs to acquire a narrow-range high-quality image for iris recognition. Therefore, it includes lens that have a relatively small angle of view. In general, the image capturing unit 171 can be a camera in a particular embodiment. In another embodiment, the image capturing unit 171 may be an image sensor or other devices that collects images of an eye, in addition to the camera. In a particular embodiment, the image capturing unit 171 may further include an additional image capturing unit that collects an image including a user's eye as a relatively wide range image. In such cases, the additional image capturing unit may include a lens having an angle of view larger than the lens used for capturing images for iris recognition.

The display unit 130 acts as user interface and may display an image collected by the image capturing unit 171.

The control unit 110 controls operations of illuminating unit 151, image capturing unit 171, and the display unit 130.

FIGS. 2 to 6 show an in-detail operation of iris recognizing apparatus 100.

FIGS. 2 to 4b show some of the images collected using apparatus 100.

Figure 2:
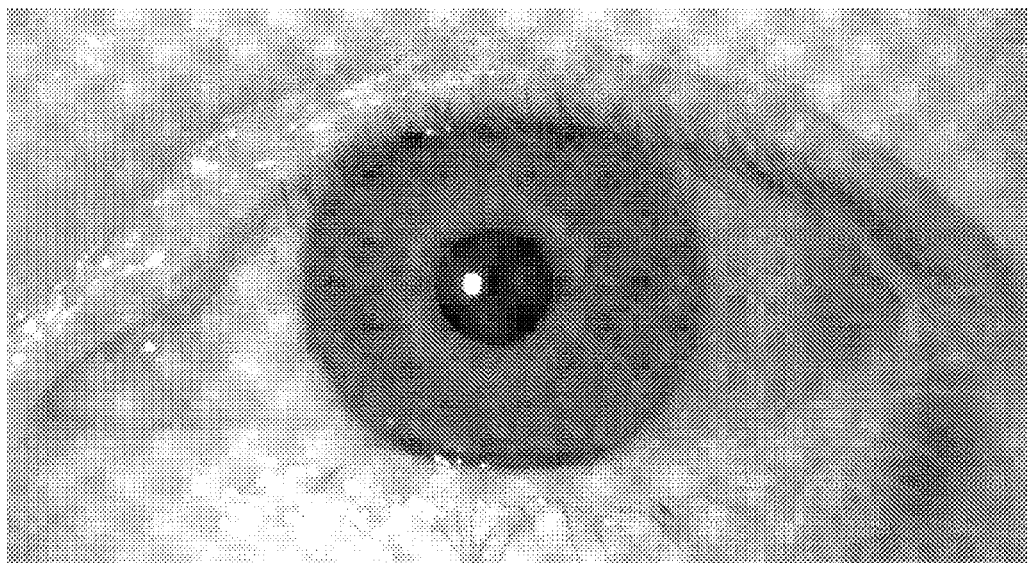
FIG. 2 shows an image of an eye without a lens.

FIG. 2 shows image of an eye without lens.

Most of contact lenses are circular in shape. Thus, when worn on eye, the boundaries of this lens create a curved impression on the eye. The location of the impression depends on the type of contact lens worn.

Figure 3:
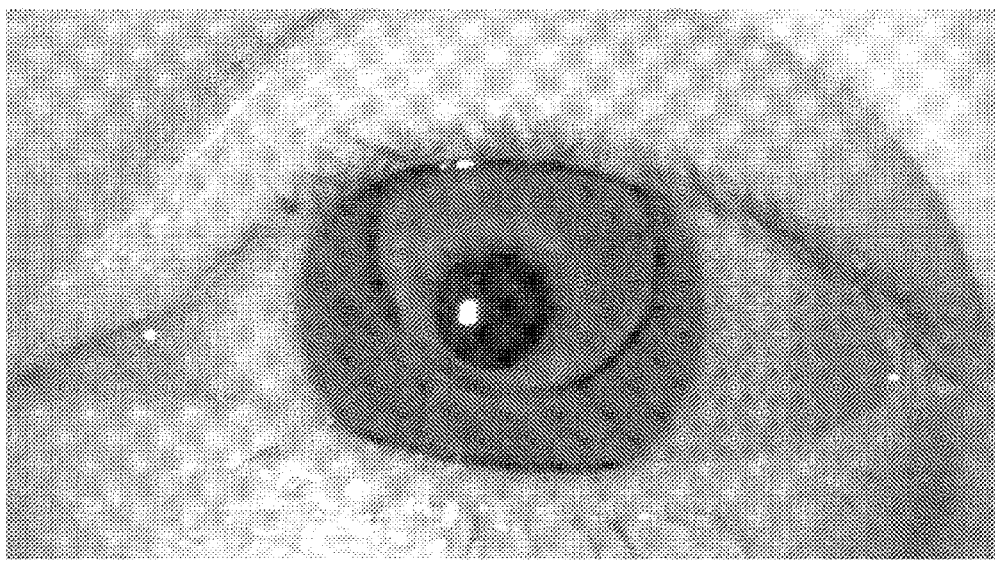
FIG. 3 shows an image of an eye with a hard lens.

FIG. 3 shows an image of an eye with a hard contact lens.

From FIG. 3, a curved edge can be clearly seen in iris region, which is formed because of boundary of hard contact lens. Hard contact lens, usually of curved shape, will form same edge impression against walls of iris.

Figure 4A:
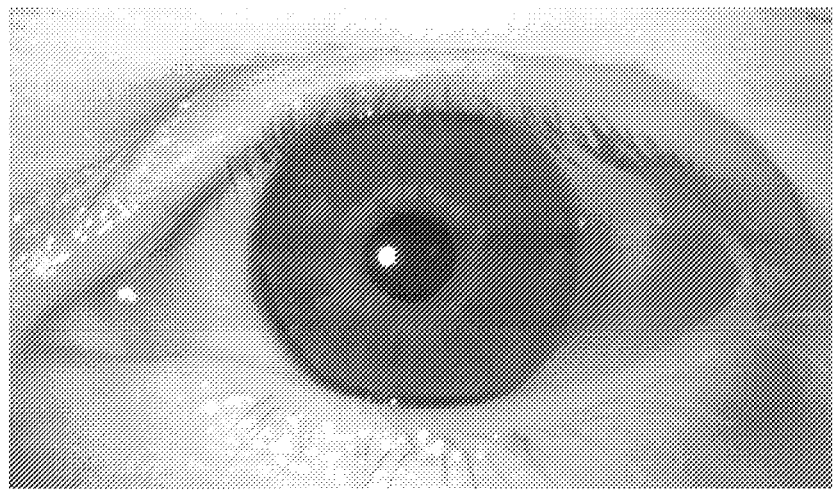
FIGS. 4a and 4b show images of eyes with clear soft lens and cosmetic soft lens respectively.
Figure 4B:
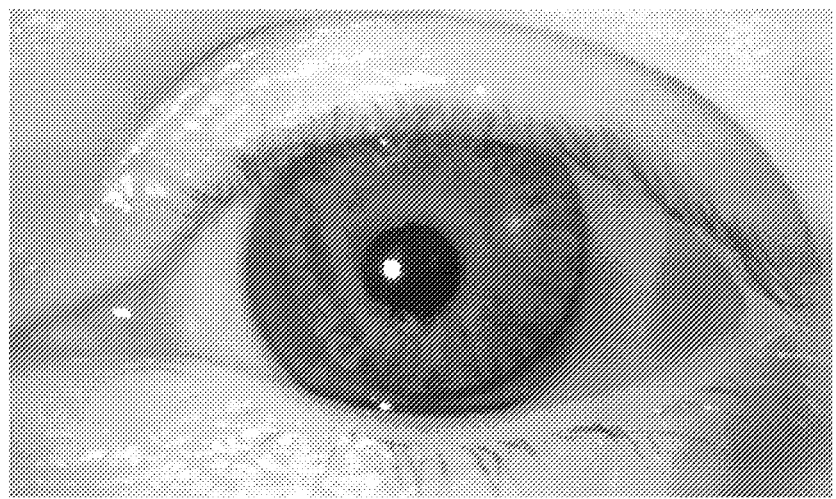

FIGS. 4a and 4b show images of an eye with clear soft lens and cosmetic soft lens.

In FIGS. 4a and 4b, a curved impression can be seen in the sclera region unlike FIG. 3. In particular, the impression is of curved shape in both FIGS. 4a and 4b. The reason for this is that the boundary of soft lens, usually of curved shape, will form same edge impression against walls of sclera.

Thus, the iris recognizing apparatus 100 can detect the presence of contact lens based on the curved edge information of a collected eye image. In particular, using the locations of curved edges, apparatus 100 can exactly determine the type of contact lens worn by the user.

Additionally, use of cosmetic soft contact lens introduces a new pattern (often repetitive) on the iris region. In such cases, the contrast between iris region and sclera region is higher than usual as shown in FIG. 4b. Analyzing the strength of edge between sclera and iris boundary may help in detecting cosmetic contact lens. In addition, when a user wears cosmetic lens, a unique pattern (often repetitive pattern) that the cosmetic lens has, is represented on the iris region. Therefore, analyzing the pattern within the iris region before iris recognition helps in detecting such lenses.

Figure 5:
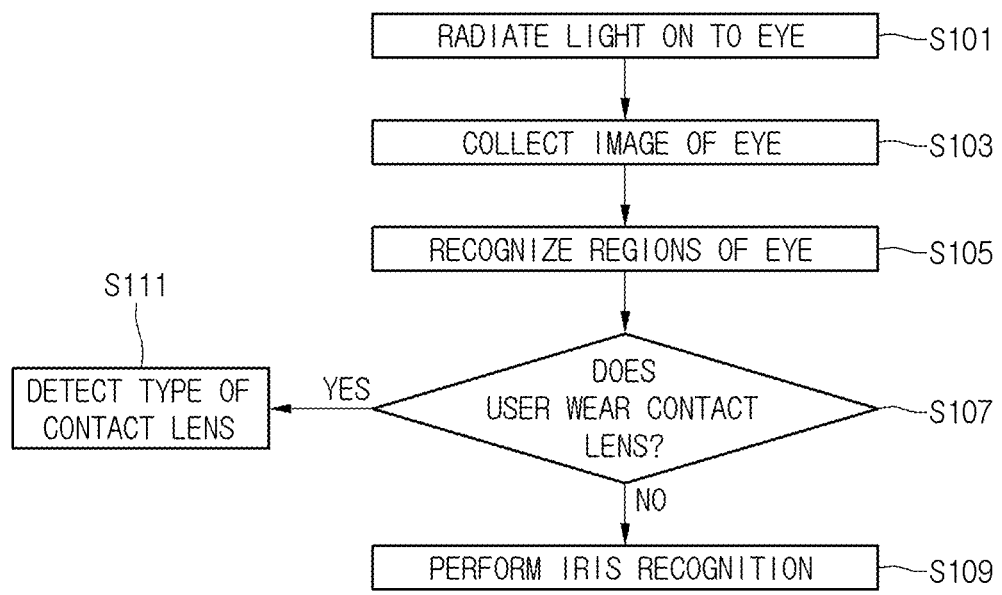
FIG. 5 shows a flowchart describing the steps involved in determining the presence of contact lens by iris recognizing apparatus according to an embodiment.

FIG. 5 shows a flowchart describing the steps involved in determining the presence of contact lens by iris recognizing apparatus according to an embodiment.

The illuminating unit 151 illuminates the eye in step S101.

The image capturing unit 171 acquires images of the eye in step S103.

The control unit 110 localizes the eye region from the collected image.

The control unit 110 detects the presence of contact lens in the eye image in step S107. In particular, it uses edge detection algorithm in order to highlight the boundaries of contact lenses. The control unit 110 also uses a noise suppression algorithm on top of the edge detection algorithm in order to prevent curved edges from being obstructed by original iris pattern of the eye. The control unit 110 determines the presence of contact lens based on whether a curved edge is detected within the eye or not. Along with this, the control unit 110 also uses the pattern information present on the iris region in order to determine the presence of cosmetic contact lens.

In the presence of contact lens, the performance of iris recognition systems may decrease. In a particular embodiment, the iris recognizing apparatus 100 notifies administrator of the iris recognizing apparatus about the presence of contact lens through the control unit 110. The iris recognizing apparatus 100 may stop iris recognition and display a message requesting user to remove the contact lens through the display unit 130.

If contact lens has not been detected, the control unit 110 performs iris recognition in step S109. In particular, the control unit 110 extracts the pattern of iris from the image acquired by image capturing unit 171. The control unit 110 compares the pattern of iris extracted with that of iris stored in a storage unit (not shown) to identify a user. When the pattern of iris extracted, matches with that of stored iris to some extent, the control unit 110 authenticates the user's claim.

When it is detected that a user has worn a contact lens, the control unit 110 determines the type of the contact lens in step S111. Related descriptions are provided in FIG. 6.

Figure 6:
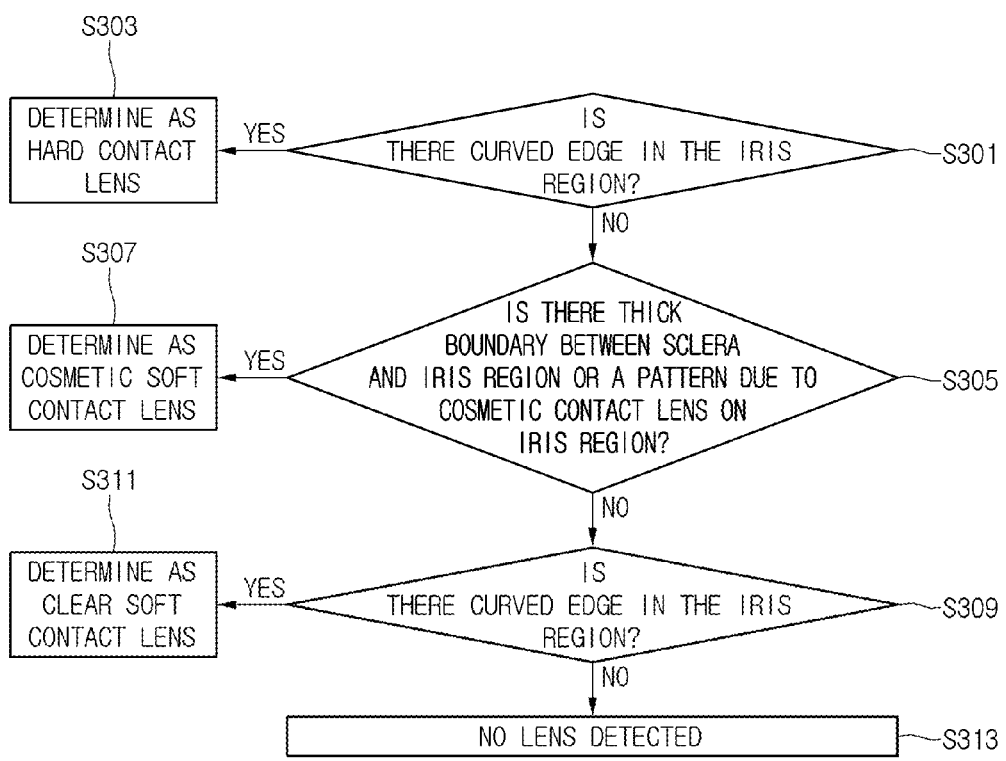
FIG. 6 shows a flowchart describing the steps involved in detecting and recognizing the type of contact lens worn according to an embodiment.

FIG. 6 shows a flowchart describing the steps involved in detecting and recognizing the type of contact lens worn according to an embodiment.

The control unit 110 initially detects the type of a contact lens based on the edges detected with in the eye image. In particular, it detects the edge component by applying edge detection and noise suppression operations.

The control unit 110 checks for curved edges in the iris region in step S301.

When there is a sign of curved edges present within the iris region, the control unit 110 determines that a hard contact lens has been detected in step S303. In a particular embodiment, when it is detected that if user has worn a hard contact lens, the control unit 110 may perform iris recognition considering the edges of the hard lens. In particular, the control unit 110 may ignore the region under the edges formed due to the presence of hard lens and perform iris recognition. Alternatively, the control unit 110 may correct the edges formed due to the hard lens and perform iris recognition. Masking out or modifying edges related to boundaries of hard lens helps in removing or modifying unnecessary pattern, which helps in improving the performance of the iris recognizing apparatus 100. In addition, the iris recognizing apparatus 100 may warn the administrator or display a message on the display unit 130 requesting user to remove his or her contact lens.

When there are no curved edges in the iris region, the control unit 110 checks for thick boundary between the sclera region and the iris region in step S305. In particular, the control unit 110 checks for the presence of thicker boundary, usually of the edge strength greater than certain predefined value. The reason for this is that the contrast difference between iris and sclera in the presence of cosmetic contact lens increases in most of the cases.

However, some of the cosmetic contact lenses are designed for natural look, for such lenses, the boundary of the lens is usually semi-transparent, and the above mentioned technique may not help in detecting them. Therefore, control unit 110 performs an additional step in S305. In general, when a user wears cosmetic contact lens, a unique pattern (often repetitive pattern) that the lens has is introduced up on the iris region. Therefore, analyzing the pattern in the iris region before iris recognition helps in detecting such lenses. In general, textural feature descriptors like Local Binary Pattern (LBP), helps in analyzing the texture present on the cosmetic contact lens. The textural feature descriptors help convert the texture present on the iris region in to array of numbers (as known as feature vector). The control unit 110 extracts feature vector from the image of the eye presented to the iris recognizing apparatus 100. Based on the numbers in the feature vector, control unit 110 classifies the eye image as either an eye with cosmetic lens or an eye without cosmetic lens. Control unit 110 uses machine learning techniques for this classification. In this particular embodiment, an improved LBP known as Completed Local Binary Pattern (CLBP) is used as feature descriptor. LBP extracts only binary string in order to represent the texture. CLBP uses the pixel information along with binary string. Using pixel information helps in differentiating an eye with cosmetic contact lens with the one without cosmetic contact lens. In this particular embodiment, a Support Vector Machine (SVM) is used for classification. The presence of cosmetic soft contact lens is determined in step S307.

After checking for the presence of cosmetic contact lens, the control unit 110 decides up on clear soft lens in step S309. When there are no curved edges present in the iris region and when there is no sign of cosmetic contact lens, the control unit 110 checks for curved edges in sclera region in step S309. The reason for this is that the boundary of soft lens, usually of curved shape, will form same edge impression against walls of sclera as described above.

In a particular embodiment, when it is detected that a user has worn a clear soft contact lens and not cosmetic soft contact lens, the control unit 110 may perform iris recognition even in the presence of clear soft lens. Alternatively, the control unit 110 may correct pattern that is affected due to the clear soft lens and perform iris recognition. Accordingly, the iris recognizing apparatus 100 may increase the percentage of the successful iris recognition of users even in the presence of clear soft lens. In addition, the iris recognizing apparatus 100 may warn the administrator or display a message on the display unit 130 requesting user to remove his or her contact lens.

The characteristics, structures, and effects described in the embodiments above are included in at least one embodiment but are not limited to one embodiment. Furthermore, the characteristic, structure, and effect illustrated in each embodiment may be combined or modified for other embodiments by a person skilled in the art. Thus, it would be construed that content related to such a combination and such a variation are included in the scope of the present invention.

Embodiments are mostly described above. However, they are just examples and do not limit the present invention. A person skilled in the art may appreciate that several variations and applications not presented above may be made without departing from the essential characteristic of embodiments. For example, each component particularly represented in embodiments may be varied. In addition, it should be construed that differences related to such a variation and such an application are included in the scope of the present invention defined in the following claims.

What is claimed is:

1. An apparatus for recognizing an iris in an eye, comprising:
   an image sensor to acquire an image of the eye;
   a control unit configured to detect a type of contact lens worn, using the image of the eye; and
   a display configured to display a message,
   wherein the control unit is configured to:
   determine a presence of hard contact lens, when a curved edge component is detected in an iris region of the image of the eye,
   determine a presence of soft contact lens, when the curved edge is detected in sclera region of the image of the eye,
   determine a presence of cosmetic contact lens of soft contact lens, when a thicker edge, which has an edge strength greater than a predefined value, is present in a boundary region of iris and sclera of the image of the eye,
   determine a presence of clear contact lens of soft contact lens, when there is no sign of cosmetic contact lens and when the curved edge is detected in sclera region of the image of the eye,
   perform iris recognition based on an obstacle caused by an edge of the hard contact lens when a user wears the hard contact lens,
   perform iris recognition based on an obstacle caused by an edge of the clear contact lens when the user wears the clear contact lens, and
   stop iris recognition and display a message requesting the user to remove the cosmetic contact lens through the display.

2. The apparatus according to claim 1, wherein the control unit is configured to determine the presence of the cosmetic contact lens, when Support Vector Machine (SVM) classifies the input image based on a feature vector extracted using a completed local binary pattern (CLBP).

3. The apparatus according to claim 2, wherein the control unit is configured to perform iris recognition based on an obstacle caused by the cosmetic contact lens.

4. The apparatus according to claim 1, wherein the control unit is configured to classify the image of the eye in to one of the four classes the hard, cosmetic, soft and no lens comprises the steps of:
   creating the edge information of the image of the eye of eye image using contextual based noise suppressing algorithm,
   analyzing the edge information in the eye image's iris region, sclera region and iris-sclera boundary regions; and
   calculating the probability of having lens edges in the said regions to determine the kind of lens.

5. The apparatus according to claim 4, wherein the control unit is configured to use only edge features of the type of lens to classify into one of the four classes hard, cosmetic, soft and no contact lens.

* * * * *